United States Patent
Knox et al.

(10) Patent No.: US 8,668,799 B2
(45) Date of Patent: Mar. 11, 2014

(54) METHOD OF MAKING OPEN-ENDED THERMOPLASTIC BELTING

(71) Applicant: The Gates Corporation, Denver, CO (US)

(72) Inventors: John Graeme Knox, Oxford, MI (US); Lambert Pasch, Roetgen (DE); Mark William Scharr, Deerfield, NH (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 13/715,977

(22) Filed: Dec. 14, 2012

(65) Prior Publication Data

US 2013/0153126 A1     Jun. 20, 2013

Related U.S. Application Data

(60) Provisional application No. 61/570,815, filed on Dec. 14, 2011.

(51) Int. Cl.
*B29C 39/18* (2006.01)

(52) U.S. Cl.
USPC .................. 156/179; 156/244.12; 156/244.22; 264/277

(58) Field of Classification Search
USPC ......... 156/179, 244.12, 244.22; 264/261, 277
See application file for complete search history.

(56) References Cited

U.S. PATENT DOCUMENTS

| | | | |
|---|---|---|---|
| 1,481,866 A | 1/1924 | Heist | |
| 1,500,232 A * | 7/1924 | Castricum | 156/437 |
| 3,078,206 A | 2/1963 | Skura | |
| 3,338,107 A | 8/1967 | Kiekhaefer | |
| 3,419,449 A | 12/1968 | Di Valerio et al. | |
| 3,556,892 A | 1/1971 | Hilliard, Jr. | |

(Continued)

FOREIGN PATENT DOCUMENTS

| | | |
|---|---|---|
| DE | 1214392 B | 4/1966 |
| DE | 1270268 B | 6/1968 |

(Continued)

OTHER PUBLICATIONS

John Graeme Knox, "The Engineering Development of Power Transmission Belts Based on Thermoplastic Polyurethane Elastomers," Ph.D. Thesis, Univ. of Ulster, Ch. 5 & 6, Mar. 2003.

(Continued)

*Primary Examiner* — Michael Tolin
(74) *Attorney, Agent, or Firm* — Paul N. Dunlap, Esq.; Jeffrey A. Thurnau, Esq.

(57) ABSTRACT

A system and method of making an open-ended, reinforced, layered belt having a profile layer, a top layer material, and tensile cords fully encapsulated there between. The method includes engaging portion of the profile layer on a rotatable cylindrical mandrel with an engaging roller, disengaging with a take-off roller, and applying and fusing the cords to the profile layer at a desired cord spacing there between. The cord may be fused by melting the profile layer surface with a heated plow and/or with heated cord. The cord is then covered with the top layer material in a lamination step involving heating to melt at least a portion of the top layer and pressing it to fuse it to the reinforced profile layer. Lamination may be done downstream or directly on the mandrel.

16 Claims, 5 Drawing Sheets

(56) References Cited

U.S. PATENT DOCUMENTS

| | | |
|---|---|---|
| 3,880,558 A | 4/1975 | Breher et al. |
| 3,973,894 A | 8/1976 | Lindner et al. |
| 3,999,914 A | 12/1976 | Breher et al. |
| 4,058,424 A | 11/1977 | Breher |
| 4,083,838 A | 4/1978 | Breher |
| 4,251,306 A | 2/1981 | Breher |
| 4,268,471 A | 5/1981 | Breher |
| 4,361,456 A | 11/1982 | Reschke |
| 4,515,743 A | 5/1985 | Breher |
| 4,563,323 A | 1/1986 | Breher |
| 4,755,334 A | 7/1988 | Grimm et al. |
| 4,980,445 A * | 12/1990 | van Der wal et al. ........... 528/76 |
| 5,837,085 A | 11/1998 | Chen et al. |
| 6,358,030 B1 | 3/2002 | Ampulski |
| 6,942,828 B2 | 9/2005 | Kolling |
| 6,966,763 B2 | 11/2005 | Göser et al. |
| 7,090,312 B2 | 8/2006 | Soucy et al. |
| 8,033,619 B2 | 10/2011 | Bellemare |
| 8,052,820 B2 | 11/2011 | O'Donnell et al. |
| 2009/0127739 A1 | 5/2009 | Göser |

FOREIGN PATENT DOCUMENTS

| | | |
|---|---|---|
| DE | 1291473 B | 3/1969 |
| DE | 3527640 A1 | 2/1987 |
| DE | 19544885 A1 | 5/1997 |
| DE | 102007017926 A1 | 10/2008 |
| DE | 202009003295 U1 | 6/2009 |
| EP | 1686286 A2 | 8/2006 |
| EP | 1710469 A2 | 10/2006 |
| GB | 886754 | 1/1962 |
| GB | 1286531 A | 8/1972 |
| JP | 2172718 A | 8/1972 |
| JP | 63162225 A | 7/1988 |
| JP | 2001205714 A | 7/2001 |
| JP | 2002172708 A | 6/2002 |

OTHER PUBLICATIONS

International Search Report, PCT/US2012/069929, Mar. 22, 2013.

* cited by examiner

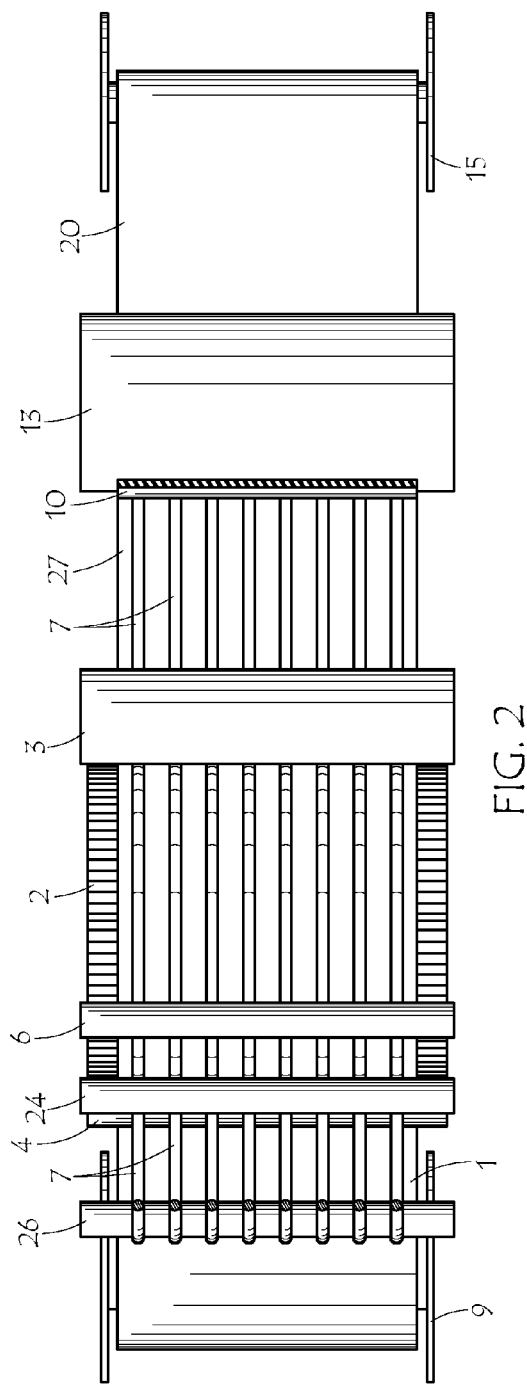
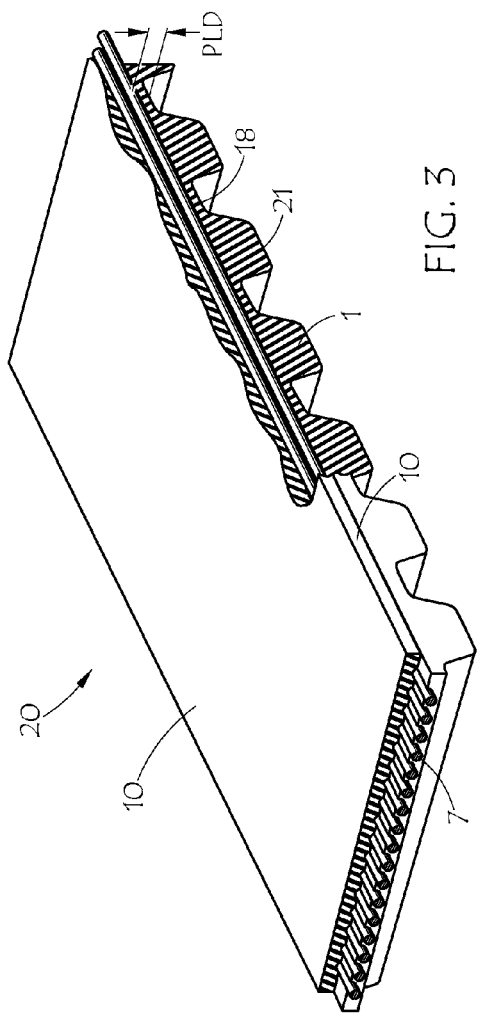
FIG. 2
FIG. 3

METHOD OF MAKING OPEN-ENDED THERMOPLASTIC BELTING

BACKGROUND OF THE INVENTION

1. Field of the Invention

This invention relates generally to a system for making open-ended belting reinforced with a tensile cord layer that is totally encapsulated, without use of mold flights or noses.

2. Description of the Prior Art

Conventional processes of continuous extrusion-forming of thermoplastic elastomer ("TPE") or thermoplastic urethane ("TPU") reinforced belt profiles utilize a rotatable molding wheel which is supplied with a molding band (usually of flexible steel) wrapping around about half of the circumference of the molding wheel to form a rotating molding chamber into which cords are fed along with extruded belt material. For making toothed belts, the molding wheel has teeth with winding noses or flights on the mold teeth to support the reinforcing cord and thus set the pitch line differential ("PLD") of the belt. The use of noses or flights results in cord exposure to the environment in the land area between each tooth of the finished belt. The lack of cord support on a pulley in the exposed nose region also contributes to failure of the tensile member (especially for aramid cords) when the belt is subjected to dynamic flexing. An example of a conventional process using winding noses is disclosed in U.S. Pat. No. 3,880,558 to Breher et al.

For steel wire tensile members, the cord exposure necessitates special (expensive) corrosion-resistant steels or coatings, such as a zinc coating applied to each individual filament. Post processing steps can be added to fill in the nose regions with additional thermoplastic material to protect the cords, but at additional effort and expense.

Another method of eliminating the nose region includes a specially designed dual-nozzle extruder die which places a layer of thermoplastic on the mold teeth before the cord arrives thereon, as also disclosed in U.S. Pat. No. 3,880,558 to Breher et al. However, this method does not make it easy to control the belt PLD.

Another method of eliminating the nose region includes inserting a tooth covering fabric onto the mold before the cord is placed thereon as disclosed in U.S. Pat. No. 4,515,743 to Breher. This method adds fabric expense and changes the nature of the belt surface, which may not necessarily be desirable.

Another method suited for making flat belts is disclosed in U.S. Pat. No. 6,966,763 to Goser et al., in which two layers of material are applied by two separate extrusion stations.

Mention is made of the applicants' co-pending U.S. application Ser. No. 13/715,989 filed on Dec. 14, 2012, titled "Apparatus and Method for Making Endless Reinforced Belts," claiming the benefit of provisional application 61/570,814 filed on Dec. 14, 2011, the entire contents of which are hereby incorporated herein by reference.

Conventional extrusion systems using some type of cross head die with tensile cords passing through have practical limitations with respect to producing wide belt sections. Belts wider than about two feet are not practical.

What is needed is an improved method of making continuous, open-ended, reinforced thermoplastic, profile belting, capable of much wider belt widths.

SUMMARY

The present invention is directed to systems and methods which provide continuous, open-ended, reinforced thermoplastic, profile belting with fully encapsulated cords and accurately controlled PLD, and which provide the capability of making very wide reinforced belting. The present invention also provides systems and methods which provide belting without nose regions and with improved flex fatigue resistance.

The invention is directed to a system for making an open-ended belts having a profile layer having a top side and having a belt profile on the opposite side, a top layer material suitable, and tensile cords embedded there between. The belt is made on an apparatus including a rotatable cylindrical mandrel having a mandrel profile complementary to the belt profile and an engaging roller positioned adjacent the mandrel for pressing the profile layer onto the mandrel inducing wrapped engagement of the profile layer on a wrap portion of the mandrel during rotation of the mandrel. The apparatus may include a take-off roller positioned adjacent the mandrel more or less opposite the engaging roller to disengage the profile layer from the wrap portion of the mandrel during rotation of the mandrel. The wrap portion may occupy from 45 to 315, or 90 to 300, or preferably, 180 to 270 degrees of the mandrel circumference. When the belt is a toothed belt, the profile layer has a plurality of teeth, and the mandrel has grooves adapted to mate tightly with the teeth.

The apparatus further includes a cord applicator positionable adjacent the mandrel to apply the tensile cords to the profile layer within the wrap portion at a predetermined cord spacing so that the cords are firmly attached to the profile layer before disengagement of the resulting reinforced carcass portion from the wrap portion of the mandrel. The apparatus also includes a laminator to apply and attach the top layer material to the reinforced carcass to fully cover or encapsulate the cords and complete the belt.

According to an embodiment of the invention, the laminator may include two laminating rollers downstream of the mandrel defining a nip there between to press the top layer onto the carcass therein, and a laminate heater may be positioned near the nip to provide melting energy to at least one surface of one or both of the top layer material and the carcass for fusing them together.

According to another embodiment of the invention, the laminator may include a laminating roller adjacent the wrap portion of the mandrel, defining a nip between the mandrel and the laminating roller; and a laminate heater may be positioned to provide melting energy to at least one surface of one or both of the top layer material and the carcass.

According to another embodiment of the invention, the laminator may include a molding band instead of the aforementioned laminating roller with a portion of the band wrapped around a portion of the other laminating roller or the mandrel and thus defining a laminating cavity there between. Again, a laminate heater may be positioned to provide melting energy to at least one surface of one or both of the top layer material and the carcass before they enter the cavity to be pressed together therein. Alternately, the top layer material may be completed melted or supplied in liquid form and metered into the cavity to solidify and/or cure.

According to an embodiment of the invention, the cord applicator may include a heated plow adjacent the wrap portion for plowing at least one heated groove of predetermined depth in the profile layer, and a cord laying guide positioned to lay a cord into the heated groove to fuse the cord to the profile layer. The cord applicator may press the cords less than fully into the profile layer.

The cord applicator may include a multiple cord laying guide for laying down all the desired cords side by side at some desirable cord spacing across the entire width of said belt simultaneously, the profile blade may be adapted to form multiple grooves for simultaneously laying and fusing all the cords onto the profile layer.

The cord applicator may include a pair of rotating, grooved, electrode rollers for electrically heating the portion of a conductive tensile cord trained there between, and for laying down and fusing said conductive tensile cord onto said profile layer. The cord applicator may include multiple pairs of rotating, grooved, electrode rollers for electrically heating the portion of each conductive tensile cord trained there between, and for laying down and fusing the conductive tensile cords at the desired cord spacing all at once.

The materials may be thermoplastic elastomers. The top layer and profile layer may be of the same material or two different materials. In other embodiments, the laminator may cast a liquid, curable resin for the top layer. The top layer may be a thermoset or thermoplastic material.

The invention is also directed to a method of making an open-ended, reinforced, layered belt including the steps of: (i) training a plurality of parallel tensile cords on a portion of a smooth, rotating, cylindrical mandrel, the portion including a cavity defined between the mandrel and a molding band or a gap defined between the mandrel and a laminating roller; (ii) extruding a top layer material onto the cords and metering it into the cavity defined between the mandrel a molding band or into the gap defined between the mandrel and a laminating roller; thereby forming a carcass comprising the cords embedded at one surface of a film of the top layer material; (iii) training the carcass on a portion of a profiled, rotating, cylindrical mandrel having a profile complementary to a desired belt profile, the portion including a cavity defined between the profiled mandrel and the molding band or a gap defined between the mandrel and the laminating roller, and the one surface facing the profiled mandrel; and (iv) extruding a profile layer material onto the profiled mandrel between the carcass and the mandrel surface and metering it into the cavity or into the gap; thereby forming the belt comprising the cords embedded between the top layer material and the profile layer material.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 2 is a schematic representation of view A-A of the belt-making system of FIG. 1;

FIG. 3 is a partially fragmented perspective view of a belt made by the system of FIG's 1 and 2;

DETAILED DESCRIPTION

Figure 1:
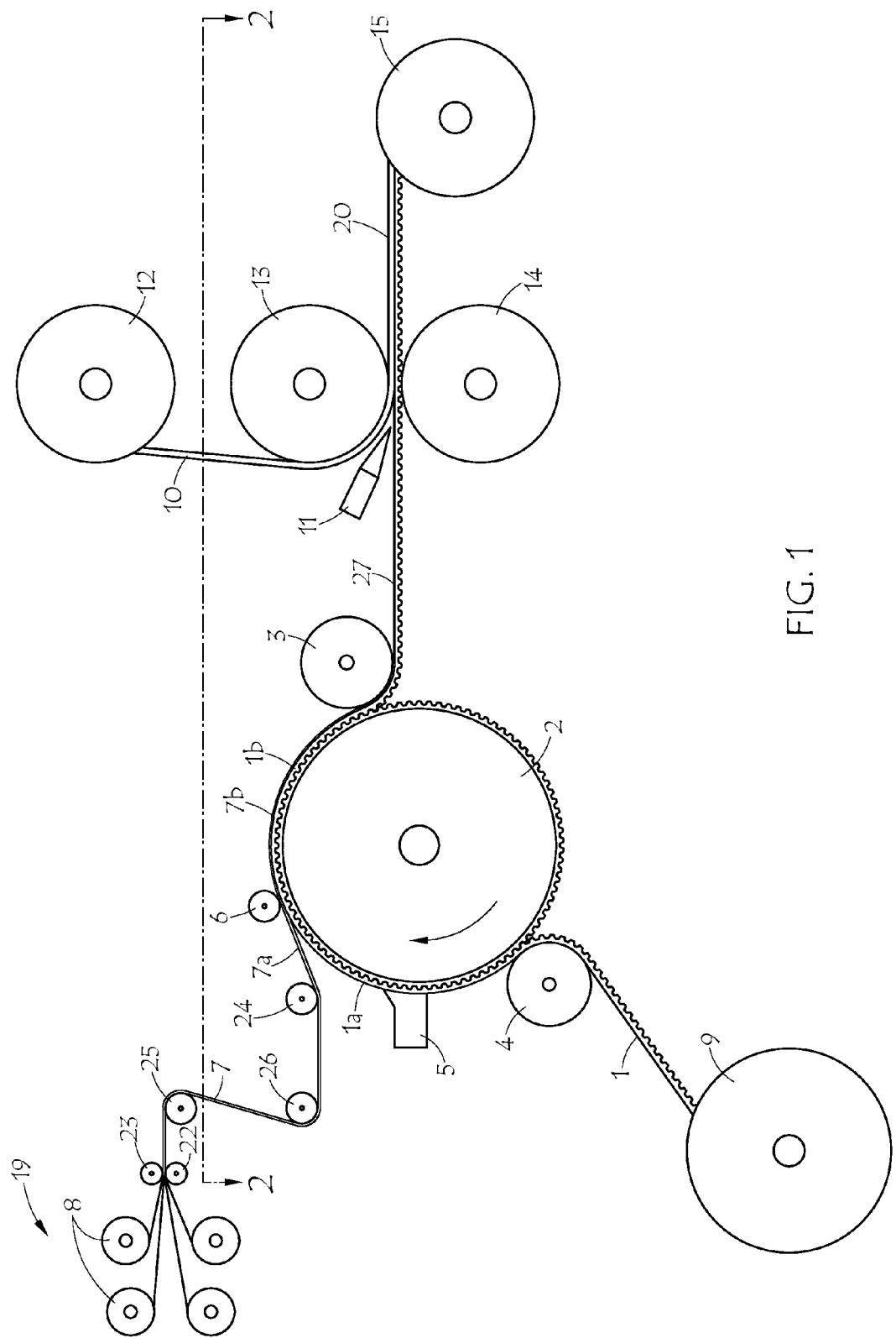
FIG. 1 is a schematic representation of a belt-making system according to an embodiment of the invention.

The invention provides a method and apparatus for manufacture of open ended belts made of an elastomeric matrix in which tension members are embedded in a longitudinal direction. Such belts can be toothed belts, flat belts, multi-v-ribbed belts, conveyor belts and similar products. The process is particularly useful for making toothed belts which require precise control of the tooth spacing or "pitch." The elastomeric matrix can be a thermoplastic polyurethane (TPU) or any other suitable thermoplastic elastomer (TPE). The process may also be adapted for castable or thermoset resins or for a vulcanized rubber matrix. The matrix may be a combination of materials, such as a laminate or blend. The matrix material(s) may include any number of desirable ingredients, including for example, anti-oxidants, anti-ozonants, UV stabilizers, anti-microbial additives, process aids, softeners, fillers, friction modifiers, foamers, and the like.

The tension members typically consist of cords, yarns, fibers or filaments of steel, but could be glass, aramid, carbon, polyester, polyamide, basalt, or other suitable materials or hybrids thereof. A yarn is a bundle of fibers, filaments or wires and may be twisted or cabled. A cord is a twisted, braided, or cabled yarn or bundle of yarns and may be treated for adhesion or handling purposes. The terms wire and cable are often used in connection with metal cords or metal tension members. Herein, "cord" or "tensile cord" will be used to refer to all types of tension members. Fabric layers or other non-typical types of tensile reinforcements may also be used in conjunction with yarn bundles or instead of more typical cords, such as tire cord, open weave scrims, woven fabrics, or nonwoven fabrics, or the like.

In the following, for example, a process is described to make a toothed belt out of thermoplastic polyurethane with steel cord as tension member, using the method and apparatus of the invention. It should be understood that the invention is not limited to these exemplary materials or belt types.

Toothed belt 20 in FIG. 3, according to an embodiment of the invention, includes three primary components: a base layer or profile layer 1, tension member 7, and top layer 10. One or both surfaces could optionally include a woven or non-woven fabric, plastic film, or other surface treatment. The profile layer and top layer could be the same material or could be two different thermoplastic materials. The profile layer and/or top layer could be laminated from a plurality of layers of one or more materials or thermoplastic materials. The reinforcement, whether cord or fabric, could be applied to the top layer Profile layer 1, may be made of continuous extruded TPE or TPU having teeth, or other desired belt profile, on one side and a flat surface on the opposite side. The profile layer may be formed by known methods of extrusion forming or molding, such as the methods disclosed in U.S. Pat. No. 4,251,306, which utilize a molding wheel and molding band adjacent about half of the circumference of the molding wheel to form a rotating profile molding chamber into which the profile material is extruded for continuous shaping. It should be understood that such forming processes may be implemented without any embedded cord for the purposes of the present invention. Thus, the present profile layer may be formed much more quickly and efficiently than prior methods wherein a belt is formed with cord embedded therein. Moreover, the belt profile formed on the profile layer may be formed without the usual indentations or defects of prior methods because flights or noses are not required for cord support. If desired the profile layer may include a textile layer or a film on the tooth surface for wear resistance, noise improvement or other purpose. Suitable textiles include woven, knitted and nonwoven fabrics, for example. The final thickness of the profile layer is selected to allow full or partial embedding of the tension member at a predetermined pitch line differential ("PLD"). PLD is a measure of the thickness of the belt under the cord line, and is defined as the distance from the belt surface in the land region to the cord center line, as indicated in FIG. 3. The land region 18 is the thin section of the belt located between any two adjacent teeth 21.

Tension member 7 is typically made of continuous filaments twisted into a cord and typically may have an adhesive coating to bond with the elastomeric matrix material(s). Tension member 7 is parallel to the belt edges. Two or more different cords may be placed in the belt side by side simultaneously. For example, one kind of cord, or two or more cords of equal or opposite twist (i.e., S and Z twist) may be used as the tension member. The tension member may be exposed at the side of the belt if the belt is cut lengthwise in the location of cord. Preferably, the tension member is fully embedded in the elastomer matrix without exposure at either side. Any suitable type of cord may be used. An adhesive coating may be applied to the cord prior to cord laying in a separate operation or to the cord or profile layer during cord laying in an integrated coating operation before the cord contacts the elastomeric matrix material(s).

Tension member 7 is applied and fused to profile layer 1 in a continuous, cord application process that will be described in more detail below. The resulting reinforced profile layer 27 is called the "carcass" or "reinforced carcass" herein. It requires the addition of top layer 10 to make completed belt 20. It should be noted that the application of the cord to the profile layer is carried out on an open mandrel without use of a molding band.

Top layer 10 is typically made of a continuous TPE or TPU sheet of either the same material as the profile layer or a different material or different formulation. For example, the profile layer may be made of a relatively stiffer material for carrying high tooth loads, while the top layer may be of a relatively softer material for higher flexibility, different coefficient of friction and/or for reduced noise and/or for reduced cost. The thickness of the top layer may be selected to complete the embedding of the tensile member and have a desired amount of additional material over the cord in the belt. The top layer preferably may have about the same width as the profile layer. The processing of the top layer in preparation for laminating may be off-line by conventional extrusion through a suitable die for a smooth top layer. If some secondary profile or texture is desired on the back side of the belt, then a process such as used for the profile material may instead be used to make the top layer. Similarly as for the profile material, a textile cover may be applied to the top layer during formation if such a cover is desired for the finished belt to modify appearance, or to reduce friction and/or noise. The top layer 10 may be identical to the profile layer 1, for example applied with teeth protruding from the top of the belt to make a dual-tooth belt, with teeth either staggered or aligned.

The lamination process is typically made using heat input to the laminating surfaces at a heating rate such that, shortly before the nip-line between two laminating rolls, only the contact surfaces of the reinforced carcass and the top layer are molten, while the bodies of these materials still remain solid and keep their shape. Temperature control of the laminating rolls is also important in combination with the rotation speed of the mandrel to insure sufficient heat on all three materials (lamination material, cord and profile material) for a good bonding and adhesion result. While going through the nip between laminating rolls, the materials are pressed firmly together to avoid air entrapment and to provide immediate bonding of all three materials (cord, top layer, and profile layer). The heat input to the material surfaces entering the laminator nip may be provided by hot air blower providing heat and airflow, or by infrared radiation, or by a hot knife or laser, or by combinations of heating means. Alternately, the lamination may utilize a pressure or molding band wrapped or placed around a portion of a mandrel to provide a longer time period for fusing the layers together than possible in a nip between two rollers. Alternately, the top layer can be extruded or metered into the space between carcass and molding band, when a molding band is used. A lamination roll in any of the embodiments could have a surface texture or pattern in order to introduce a desired texture to the top layer, i.e. to the backside of the belt.

According to embodiments of the invention, the manufacturing process includes the following steps using the apparatus as shown in FIG.'s 1 and 2.

The profile layer 1 having the desired belt profile on one side is provided in the desired length and width from spool 9. By "belt profile" is meant a belt surface configuration adapted to engage a pulley or sprocket in driving relation thereof in a belt drive system. In a friction driven belt drive system, for example, the belt profile may be flat, or V-shaped, or multi-v-ribbed, while in a synchronous or positive drive system, the belt profile may be a series of evenly spaced transverse teeth or angled or helical teeth. The present invention is particularly advantageous for making toothed belts for positive drive systems, which require close tolerances on the tooth shape and pitch and the belt pitch length for proper meshing with toothed pulleys.

The profile layer 1 is then fed around engaging roll 4 onto mandrel 2 as shown in FIG. 1. Thus, profile layer 1 is wrapped around a portion of mandrel 2, engaging the profile layer with the complementary mold profile of the mandrel. Two smooth engaging rollers 3 and 4 may be used to hold the carcass in engagement with the mold profile during mandrel rotation. These rollers are "positionable," meaning they can be moved to a desired position to accommodate different material thicknesses, different pressure requirements, and the like. They are "adjacent" or near the mandrel, meaning in close proximity to, or even touching the mandrel or the belt materials being engaged on the mandrel, thus rotating in synchronization together. The arrows show the direction of rotation of mandrel 2, and the direction of the other rollers and materials follow. The portion of the mandrel bounded by the two engaging rolls and on which the profile layer is wrapped is called the "wrap portion" or "engagement portion" of the mandrel herein. The portion of the profile layer, carcass or belt wrapped on the mandrel is likewise the wrap portion 1*a* or engagement portion thereof. In FIG. 1, the wrap portion is shown extending from about the seven o'clock position, the location of engaging roll 4, to about the two o'clock position, the position of engaging roll 3, on mandrel 2. This position is illustrated for description purpose only and may be altered without leaving the scope of this invention. The amount of wrap is not particularly limited but may advantageously be in the range from about 45 to about 315°, or from about 90° to about 300°, or from about 180° to about 270°, or about 270° around the mandrel circumference. The more wrap, generally the more accurate the pitch control and/or the faster the apparatus can be operated. While the orientation of the mandrel axis is shown as horizontal, it could be vertical or some other desired orientation. While advantageous, the engaging rolls 3 and 4 are optional in that wrapped engagement could be maintained by applying sufficient tension to the profile layer 1. The advantage of the engaging rolls is that tension becomes a non-critical variable both at the profile layer spool 9 and downstream of the mandrel beyond roll 3. When the wrapped portion of the materials is engaged on the mandrel between rolls 4 and 3, the tension before roll 4 and after roll 3 has no effect on the critical cord laying process which occurs in the wrapped portion. Thus, the tension can be chosen or optimized separately in the take-off zone and in the lamination and/or wind-up zones. There is no molding band in the cord-application zone of the wrapped portion. In particular the engagement roller 4 is not part of any molding band system.

The mandrel is rotated at a predefined speed for cord laying by a cord applicator in the wrap portion of the mandrel. All the desired number of cords are laid at the same time, preferably in a parallel, lengthwise arrangement. The cord spacing may be uniform or in any other arrangement desired. FIG. 2 shows sixteen cords 7 merely as a representative example. The cords are let off of a creel 19 which may have any desired number of spools 8 (only four are shown in FIG. 1), and the cords are guided, for example, by guides 22 and 23, and/or tensioned, for example, by tension rolls 25 and/or 26, and finally fed into the cord applicator rolls 6 and 24. In the embodiment shown, the cord applicator rolls 6 and 24 are both electrodes which supply electricity to cord sections 7*a* to heat them to a temperature suitable to melt the surface of the profile layer when pressed therein by guide roll 6 at the desired depth to control the pitch line of the belt. Then the materials quickly cool, fusing the cords to the profile layer 1*b* to form reinforced carcass 27 with partially embedded cords 7*b*. Electrical heating is particularly useful for conductive cords such as steel cords or carbon fiber cords. For other types of cord materials, other heating means may be used, such as hot air blowers, radiant heaters, and the like. According to an embodiment of the invention, the cord applicator includes a pair of electrodes for each cord, which may be grooved rollers over which the cords move, which supply sufficient current through the cord to heat each cords. The heat supplied may be enough to melt the profile layer and fuse the cords into the profile layer as the cords are brought into contact therewith. Preferably, the heating of each cord is controlled individually. The current may be supplied directly to isolated grooved roller electrodes by brushes, either internal or external, i.e., the electrode rollers may be slip rings or like slip rings which transmit electricity from a fixed to a rotating body. Alternately, the current may be supplied to the electrodes through the shaft and connected to the power and control source by a separate slip ring device with sufficient circuits for each cord. In another embodiment, the two electrode rollers may be designed solely to transmit power to heat the cords, and a third roller used to apply the cords to the profile layer. Such a design would correspond to FIG. 1 if rollers 24 and 26 were the two electrodes and roller 6 the applicator roller, for example.

According to another embodiment of the invention, also shown in FIG. 1, heated profile blades 5 are positioned against the back side of the profile material to melt grooves into the profile material at a precise depth, width and temperature. The heated blades 5 may have a profiled edge which forms a groove on the back side of the profile layer 1*a*. Then the tension members or cords 7 are provided from cord creel 19 and supplied to the guide roll 6, which places the cord into the groove at the desired depth to control the pitch line of the belt. The groove width and depth may be about the same as the cord diameter. The heated blade preferably acts like a plow as it forms a groove of molten material. Cord guide roll 6 supplies cord 7*a*, guides and presses it into the groove before the groove material re-solidifies. The distance between blade and cord guide roll, cord lay speed, and temperatures should be controlled such that the TPE material stays molten until the cord is embedded. The result is reinforced profile 1*b* with cord 7*b* fused thereon, i.e. carcass 27.

According to another embodiment of the invention, the above heating and/or groove-forming methods may be combined. Thus, the grooves may be formed by the heated profile blades, and the cord may heated before embedding or fusing. If the groove solidifies before the cord contacts it, then the heating of the cord should be sufficient to remelt the groove surface to fuse the cord to the profile material. Alternately, the fusing of the cord to the profile material may be by means of a tacky adhesive which may be applied to the cord earlier or during the cord application process.

In each embodiment, the heating and/or groove formation may be controlled to allow variable speed cord laying, e.g. to accommodate initial ramp-up or other speed changes. Also, the molten TPE or TPU material of the profile layer may rapidly cool as the cord is embedded into it or before embedding as described above. Either way, the cords are bonded to the profile material before the wrapped portion exits the engagement portion of the mandrel. The cord is thus partially embedded and fused to the profile layer and is able to freeze the pitch of the teeth very accurately while the resulting reinforced carcass is still engaged on the mandrel. The pitch is then accurately retained even when the carcass is disengaged from the mandrel because of the typically very high tensile modulus of the cord. The heated blades are positioned a predetermined distance from the mandrel surface to control the cord position against the profile surface for exact pitch-line control. As a result, the cord position is not affected by irregularities in thickness or surface waviness of the profile layer. The precise depth of the groove and the precise placement of the cord results in a precisely controlled pitch line and PLD as is desirable particularly for toothed belts. During cord laying the cords are also tensioned to a predefined level to achieve the correct length and pitch of the belt. Cord feed apparatus 19 may thus include one or more spools or reels, associated tensioning or braking apparatus and the like, as desired, and not necessarily as illustrated in FIG. 1. Also, cord temperature may be increased or controlled in the cord lay zone to remove moisture, to adjust or stabilize the melting and fusing effect, and/or to minimize the effect of environmental conditions such as humidity or temperature.

It should be understood that by fusing the cords to make the carcass at the desired PLD and tension, the portion of the reinforced carcass 27 leaving the mandrel and proceeding through the lamination section does not require any particular tension to maintain cord spacing, cord lay belt pitch, or integrity of the carcass. This principle eliminates the need to hold the carcass under a given tension when it is disengaged from the mandrel and makes the process simple and very effective in productivity as well as in dimensional accuracy. Thus, a number of the problems associated with prior art methods are eliminated. Reliance on building the belt on a single mandrel for pitch (tooth spacing) control represents a distinct advantage over prior methods which might have used two or more profiled mandrels, allowing significantly lower cost and more compact equipment design, providing higher material-, labor- and energy-efficiency as well as more accurate product dimensions, particularly pitch control on long, endless, toothed belts. Some useful amount of tensioning may of course be utilized advantageously to insure proper training of the belt through the lamination and windup sections as discussed previously.

It should also be understood that according to the present method, the cord is fully supported by the profile layer. This also represents a distinct advantage over prior methods which required small flights or protrusions or noses on each tooth of the mandrel to lift the cord off of the mandrel surface for a desired PLD. Such flights resulted in cord bends which could weaken the cord or lead to early fatigue failure. Such flights also resulted in cord exposure at the flight impressions in the land area in the finished belt, which could also be points of contamination and/or corrosion causing early belt failure. The elimination of flights also allows the same apparatus to produce belts with a variety of cord material types, cord diameters, and/or PLD. Conventional methods using flights normally required new mold tooling to accommodate a change in the cord thickness. Also the use of certain tension member materials like glass fiber was not possible because the flights would damage such material during manufacture and operation of the belts. The invention allows the use of all types of tension members on the same tooling by adjusting the position of the heated groove profiling device to control PLD. "Tooling" is used to refer to the mandrel, i.e., a specialized mold limited (unless substantially altered) to making belts having the specific profile of the tool. The tooling of the present invention is much more versatile than in prior art methods.

Electrical heating of metal cords may be used to fuse it to the thermoplastic. The present invention, with a heated blade, normally does not require heating of the cord and can apply to all kinds of tensile cord materials. However, heating of the cord may allow an increase in cord lay speed and can easily be provided by heating the cord before it enters the guide roll and/or heating the guide roll. Heating may be achieved electrically or with external heaters of any suitable type. The cord may be embedded approximately 30% to 100%, or 50% to 90% or about two thirds of its thickness or in the range from one-half to one cord diameter, but this may advantageously be adjusted, depending on the material of the cord and the profile layer and cord diameter, to give a desired PLD.

Some alternative groove-forming methods can be mentioned. Instead of the heated knife, laser cutting or profile grinding could be applied to form the groove in which to lay the cord. Alternately, mechanical knife cutting could be used in combination with laser heating, or infrared heating, or hot air, or the like. The grooves could be formed directly in front of the cord roller as discussed above. Alternately, the grooves could be formed in a separate operation over the whole profile layer prior to cord laying. In the latter case, if the groove is formed off line, the groove surface would be heated to melt it just before the cord is laid into the groove to achieve the required fusion of the cord to the profile material, or the cord could be heated and applied, or an adhesive could be used to fuse the cord in the groove.

After completion of the cord laying operation, top layer material 10 is applied to reinforced carcass 27 by passing the carcass through a laminator or laminating zone. The laminator illustrated in FIG's 1 and 2 includes pressure rolls 13 and 14 with a nip there between. Top layer 10 and reinforced carcass 27 form a nip where the two materials, partially molten by lamination heater 11, are pressed and joined together forming belt 20. Belt 20 may be taken up on spool 15. The process parameters of lamination speed and heat input should be adjusted such that only a thin skin of melting occurs on both surfaces without the material melting through and loosing its shape. Even pressure along the whole length of the laminating rolls is also advantageous and may be facilitated by use of an elastomeric roll, although steel rolls provide better heat transfer. The optimum heating and melting amount permits the top layer to fully bond to the carcass and cord, flowing around the portion of the cord not yet embedded, but not disturbing the pitch line and position of the cord.

Figure 4:
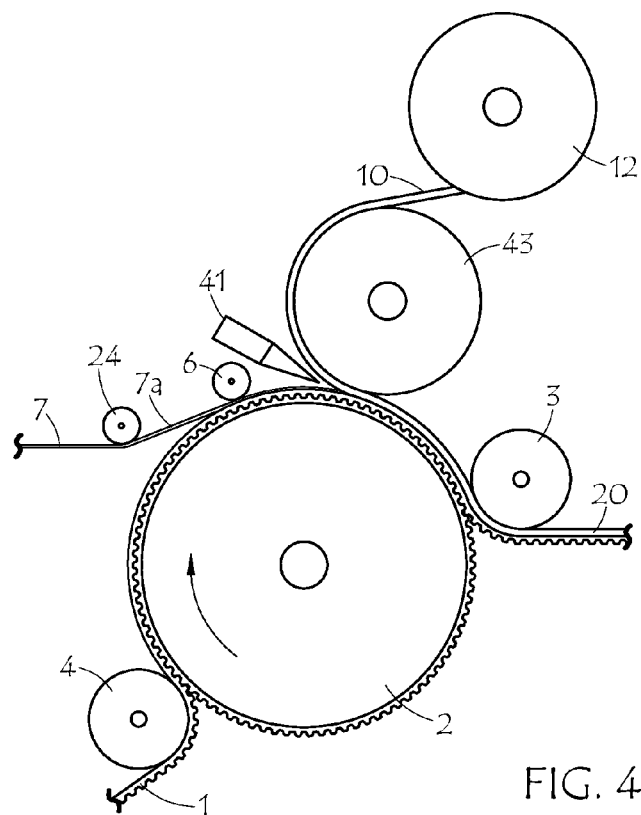
FIG. 4 is a schematic representation of a portion of a belt-making system according to another embodiment of the invention.

According to an embodiment of the invention, FIG. 4 shows the laminator integrated onto the mandrel 2, which saves space overall. In FIG. 4, the mandrel 2 and pressure roll 43 form the nip for pressing top layer 10 onto the reinforced carcass somewhere past the cord lay zone but still in the wrap portion of the mandrel. Heater 41 again supplies energy to melt the surface or surfaces for fusing together the top layer and carcass. The belt itself then is disengaged from the mandrel at engagement roller 3 and proceeds to optional finishing operations and wind up (not shown).

Figure 5:
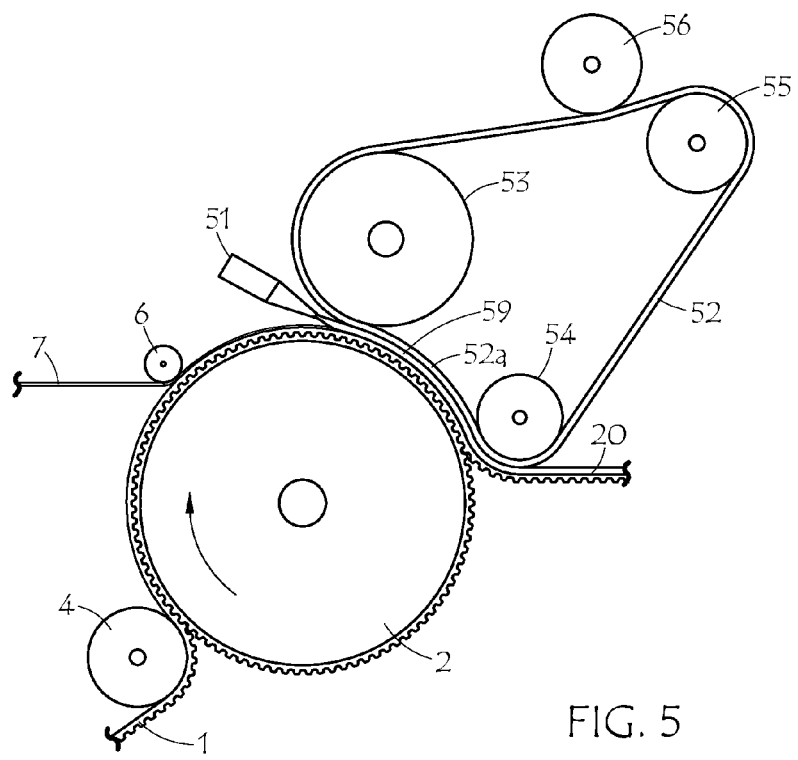
FIG. 5 is a schematic representation of a portion of a belt-making system according to another embodiment of the invention.

According to another embodiment of the invention, the laminator may use a pressure or molding band which may wrap around a portion of the mandrel, which provides longer residence time for fusing the top layer to the carcass. FIG. 5 illustrates a molding band arrangement wherein the lamination takes place directly on the mandrel after the cord is applied. Pressure band 52 is trained around rollers 53, 54 and 55. Tension may be maintained on the pressure band with a tension roller 56. Alternately, roller 56 may not be needed if roller 55 has tensioning capabilities. Profile layer 10 (not shown) may be introduced to the nip between pressure band 52 and mandrel 2 located at pressure roll 53, analogous to FIG. 4. Heat may be applied just as in FIG. 4. Roller 54 may be part of the molding band system and function as the engagement roller 3 in FIG. 1 or 4. Alternately, a separate roller (not shown) may be used for disengaging the belt from the mandrel. The pressure band could have a surface texture or pattern in order to introduce a desired texture to the top layer, i.e. to the backside of the belt.

According to another embodiment of the invention, with a pressure band in place, also shown in FIG. 5, a fluid metering nozzle 51 may be used to apply liquid material 59 to form the top layer 10 within the cavity defined between a portion of the pressure band 52a and the mandrel 2. Instead of laminating directly on the mandrel, the pressure band laminator may be positioned down stream in a way analogous to the laminator location in FIG. 1. Then the pressure band would wrap around a second pressure roll (like pressure roll 14 in FIG. 1), instead of around mandrel 2. In either case, flanges on the ends of mandrel 2 or roll 14 may be used to seal the edges of the corresponding molding cavity to prevent liquid material from oozing out. The liquid material may be molten thermoplastic such as TPE or TPU material. The liquid material 59 may be a curable liquid such as liquid silicone resin, castable polyurethane, or the like. The metering nozzle 51 may include an extruder for thermoplastic materials, or a gear pump for curable liquid resins, or other appropriate device or devices. Any suitable resin may be used provided suitable adhesion is achieved with the carcass. Foaming resins may be used to achieve a desired compressibility or softness of the top layer. A textile layer could be applied to the carcass to be embedded between the carcass and the top layer.

In another embodiment utilizing a resin casting option, the cast resin may be applied onto the carcass without a pressure band and cured without external pressure. Any suitable resin may be used provided suitable adhesion is achieved with the carcass. Foaming resins may be used to achieve a desired compressibility or softness of the top layer. Edge flanges on the mandrel may be useful to prevent liquid resin from flowing off the mandrel before curing. Typically, the surface will then need to be ground or trimmed to achieve a final smooth surface and a belt of uniform thickness.

Another method to apply the cord and provide lamination in one operation is proposed by using a mini-extruder which has a die which is designed for coating cords 7 to guide the cord through and apply the TPU or TPE material around it sufficient in quantity and shape to provide the cord lay and the lamination material for this section at the same time. Then the lamination material is applied along with the cord laying. The extrusion part of this method is similar to a cable pultrusion process, which provides a further improvement to speed and cord embedding. This method may be applied in combination with the groove cutting blades or without them. This method may be applied with a pressure band or without.

After manufacturing the belt, the same process may be adapted and used to grind the surface of the backside or to otherwise machine the sleeve to provide a smooth or specific designed pattern on the back surface. Optionally or in addition, the back surface of the sleeve can be laminated with a fabric and method described for example to provide specific friction, wear or noise characteristics. Finally the belt may be printed or labeled and/or cut into a desired belt width while rotating on, installed on, or otherwise using, an embodiment of the same apparatus.

The method and apparatus also allows one to apply cord onto a carcass wide enough for multiple belts leaving plenty of space free of tension member between each belt. This space facilitates the cutting of the belts, and results in belts with no cord exposed on the cut edge, i.e. no "edge cord." The result after lamination and cutting will be open ended belts with no exposed edge cord and no exposed cord due to flights. In other embodiments, different materials can be used on the profile (e.g., for enhancing noise or load performance) and on top side (e.g., for friction, appearance, profiling or the like). Likewise, textile or fabric can be used on the profile and/or on the backside. The backside can also be profiled instead of smooth. For example, the belt could then be a two-sided timing belt, or a timing/V-belt combination, or a multi-ribbed v-belt that is single- or double-sided. Alternately, the belt could be a flat belt, or have some other specific profile or profiles.

Suitable controls can be provided for automation of the inventive apparatus and method. For example, automatic control can be applied to engage, rotate and/or disengage various rollers such as the mandrel, guide rollers, laminating roller, cord guide roll and heating blade, and the like. Automatic control can be applied to control the temperature and/or energy input of the heating blade, the lamination heater and the like. Automatic control can be applied to various optional associated finishing processes such as grinding, machining, labeling, cutting, and the like. The control algorithms can be implemented in software and/or hardware. Manual intervention or manual operation can be provided for as desired.

The open-ended belt may be cut to a desired length and joined by known methods to form an endless belt, and in the case of a toothed belt, with the desired number of teeth. Fusion of the ends may be, as non-limiting examples, by thermal fusion by heat treatment or ultrasonic welding, direct adhesion, or thin film or adhesive tape, or clamps, with butt joint or finger joint, or combinations thereof.

A number of additional advantages of the invention may be noted. By eliminating both flights and edge cord, the belt may be wholly sealed from the intended use environment as may be required for food service or other "clean belt" applications requiring cleaning, sterilization or the like. Also, the fully encapsulated tension member will be better protected against corrosion and bending, resulting in significant service life improvement. Thus, more expensive corrosion resistant steel wires (e.g. zinc-coated wires) may be replaced with more economical (e.g. not zinc-coated) steel wire.

Separate manufacture of the profile material and the top layer material has a number of advantages over prior methods where everything was formed and assembled on the same apparatus. Separate manufacture allows profile and top layer materials to be made at optimum speeds for extrusion, generally much faster than possible when cord laying and/or laminating is done at the same time. Separate manufacture also permits much easier set up of the belt making system of FIGS. 1 and 2, and for a much simpler design of that apparatus and lower capital cost. In particular, a complicated extruder with crosshead die for multiple cords and a conventional molding pressure band and its associated drive system are not necessary. Set up times may be significantly reduced and cord material utilization may be improved.

The inventive method includes snugly fitting the profile material 1 onto the mandrel 2 during cord lay by means of the engaging roll 4. In one embodiment, the teeth of the profile layer of the wrapping portion of the profile material are snug fit into the mating grooves of the mandrel in the wrapping portion. This snug fit, along with precision machining of the mandrel profile, and in conjunction with the control of the cord position, helps to insure consistent control of the pitch and pitch length of the resulting belt. It is advantageous to make the endless profile layer initially a little shorter in pitch than the final belt, to ensure the profile layer is stretched to hold the tight fit on the mandrel rather than compressed as it would be in the case where the profile layer pitch is longer than the nominal pitch of the mandrel. It is the mandrel and the cord lay process that controls the ultimate belt pitch and pitch length for a toothed belt.

It may be noted that when the inventive methods are applied to making flat belts, or profiled belts that are not intended for synchronizing with toothed pulleys, the PLD and/or pitch tolerance(s) is generally not so critical as for toothed synchronous belts. Moreover, throughout this description, the distinction between profile layer and top layer may be arbitrary, so that the final belt may be considered made upright or inverted. Thus, the profile layer described herein may be flat and the top layer may include a profile. Note that if the profile layer is flat, then the wrapped engagement of the profile layer on a wrap portion of the mandrel during rotation of the mandrel may be essentially frictional engagement which may be aided by engaging roll 4 and take-off roll 3.

Other variations of the inventive methods within the scope may be mentioned. According to one variation, the profile material may be formed directly on the profiled mandrel by extruding or metering profile or matrix material onto the mandrel, for example with a pressure band in place like the one shown in FIG. 5. According to another variation, the cord may be applied to the top layer using methods analogous to those described herein for laying and fusing cord to the profile layer. Then the carcass (i.e., the flat top layer with applied cord) may be laminated to the profile layer. This variation may be applied to any of the various embodiments described herein. In another variation, the cord laying step may be added to the step of forming the profile layer or the top layer, as the case may be. Then the lamination step may be performed separately.

Figure 6:
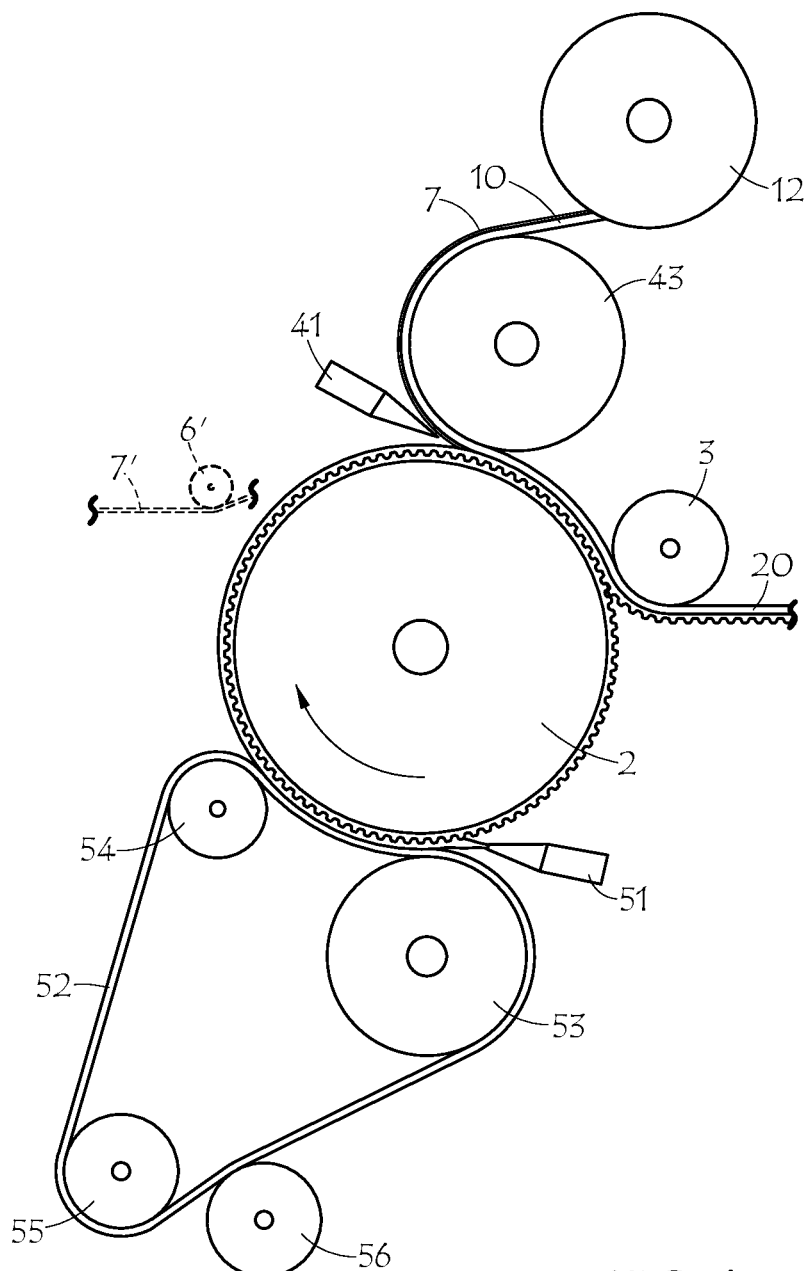
FIG. 6 is a schematic representation of a portion of a belt-making system according to another embodiment of the invention.

FIG. 6 illustrates a variation on the method and apparatus in which the profile material 1' is formed directly on the profiled mandrel 2 by extruding or metering at 51 the profile or matrix material onto the mandrel, using pressure band 52 which is guided around by rolls 53-56 like the one shown in FIG. 5. Although cord 7' could optionally be applied at 6' (as shown in dashed lines and analogous to the apparatus of FIG's 4 or 5), in this case, cord 7 is already affixed to top layer 10 which is fed from spool 12 into laminator roll 43 where heater 41 is used to fuse the two layers and embed the cord therein. Finished belt 20 then comes off the mandrel at take-off roller 3.

Figure 7:
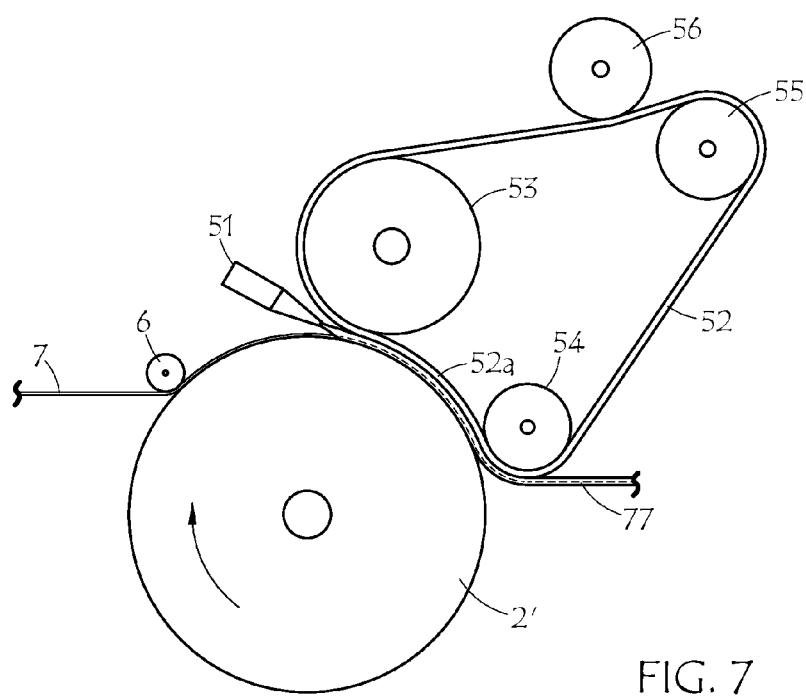
FIG. 7 is a schematic representation of a portion of a belt-making system according to another embodiment of the invention.
Figure 8:
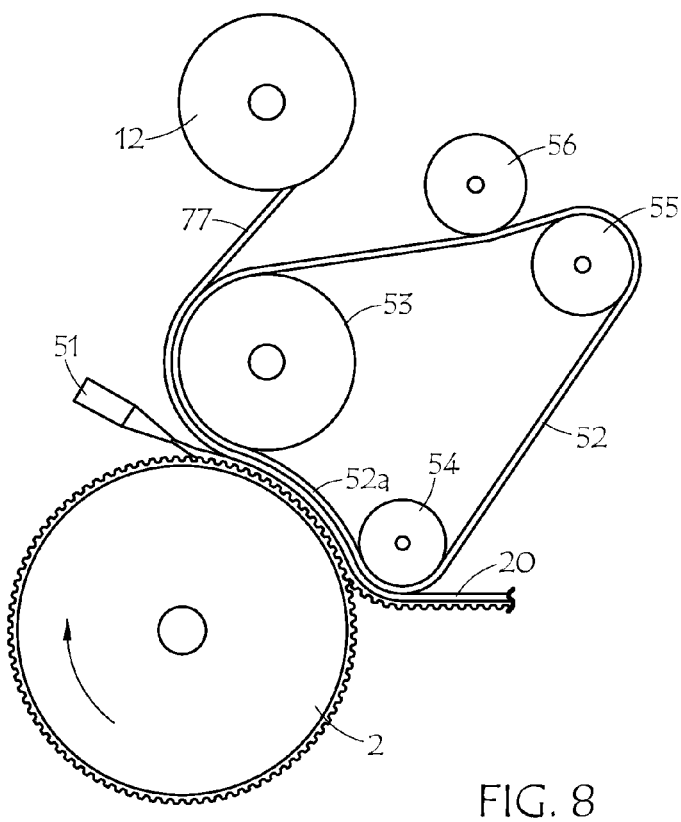
FIG. 8 is a schematic representation of a portion of a belt-making system according to another embodiment of the invention.

FIG. 7 and FIG. 8 illustrate another embodiment of the process. In a first step shown in FIG. 7, cord(s) 7 are laid onto a smooth mandrel 2' and then coated with matric material from extruder 51 which is then cooled under the pressure band 52 to form carcass 77, which is a flat film with cord embedded right at the surface. The cords may be multiple parallel cords as described for other embodiments. Extrusion and the pressure band section may also be as described in other embodiments, such as FIG. 5. In a second step, shown in FIG. 8, profile mandrel 2 replaces smooth mandrel 2', in order to make a profiled belt 20. Of course, the smooth mandrel may be used again if a flat belt is to be made. The extruder and pressure band section are now used to form the profile layer while the flat carcass 77 is fed into the pressure band section at the same time. Thus, the flat carcass, containing the tensile cord, is laminated to the profile layer as the profile layer is formed. The surface of the carcass at which the cord is just embedded is preferably placed against the profile layer to seal the cord therein. The first step is found to provide a flat film with very good control of the cord position, since the cord is laid on a smooth mandrel. The resulting belt 20 has very good cord control, and the PLD may easily be controlled by the positioning of the pressure band. According to another variation, this two-step process could be carried with a laminating roll suitable arranged close to the mandrel or forming roll, instead of the pressure band shown in the figures.

It should be noted that in the first step, FIG. 7, the cord cross section may flatten somewhat on the smooth mandrel. Then the cord may spring back after the carcass is removed from the mandrel, resulting in a flat carcass with cord slightly protruding from one surface instead of fully embedded. So the cord may be mostly embedded in the carcass. Still in the final belt, the cord will be embedded between the layers.

Thus, the embodiment of FIGS. 7 and 8 relates to a method of making an open-ended, reinforced, layered belt including the steps of: (i) training a plurality of parallel tensile cords on a portion of a smooth, rotating, cylindrical mandrel, the portion including a cavity defined between the mandrel and a molding band or a gap defined between the mandrel and a laminating roller; (ii) extruding a top layer material onto the cords and metering it into the cavity defined between the mandrel a molding band or into the gap defined between the mandrel and a laminating roller; thereby forming a carcass comprising the cords embedded at one surface of a film of the top layer material; (iii) training the carcass on a portion of a profiled, rotating, cylindrical mandrel having a profile complementary to a desired belt profile, the portion including a cavity defined between the profiled mandrel and the molding band or a gap defined between the mandrel and the laminating roller, and the one surface facing the profiled mandrel; and (iv) extruding a profile layer material onto the profiled mandrel between the carcass and the mandrel surface and metering it into the cavity or into the gap; thereby forming the belt comprising the cords embedded between the top layer material and the profile layer material.

According to other variations of the process, the profile layer may be made from a flat layer by welding teeth or other profile features to a surface of the flat layer. This may be done off line in a separate step or on the apparatus described herein in continuous fashion. Alternately, this or many of the other variations described above could be achieved by two or more passes of material(s) through the apparatus. A first pass, for example, could make the carcass, whether toothed or flat. A second pass could form and/or laminate a top layer onto the carcass. Another pass could weld or glue or fasten on profile parts, such as belt teeth for driving the belt on pulleys, or other objects, profiles, holders or such features which might ultimately be used for transporting items or material handling or the like.

According to various embodiments of the invention, it is possible to produce long length belting ranging from 10 inches to 50 inches or more in width, preferably greater than 18 inches, or greater than 24 inches, or greater than 36 inches in width. Belts wider than about 24 inches have not been practical using conventional methods, e.g. with complicated crosshead extrusion dies. It has been shown via belt tests on T10 profile TPU belts using a DeMattia flex fatigue tester that belts without flights or nose regions can out-perform commercial belts with flights by a factor of about 10. Thus, a significant improvement in performance over conventional open-ended belting may be obtained according to the inventive methods. Thus, the cord is totally encapsulated, i.e., not exposed except at a cut cord end at the end of an open-ended belt.

The invention systems and methods described herein could also be used to make tracks for use in track drive systems for various types of track-driven vehicles, including without limitation, snowmobiles, snow cats, and other transportation vehicles, military vehicles, construction vehicles, robots, and the like. Examples of such an endless track are disclosed in U.S. Pat. No. 3,338,107 to Kiekhaifer, U.S. Pat. No. 8,033,619 to Bellemare, and U.S. Pat. No. 7,090,312 to Soucy et al., the contents of which are hereby incorporated herein by reference. The track may have a series of internal drive lugs, which may be formed and engaged on the mandrel in a way analogous to the teeth on a toothed belt, as described herein. Likewise, the track may have a series of external traction lugs, which may be formed in way analogous to the teeth on a dual toothed belt as also described herein. The track may be cut to a desired length and joined by known methods to form an endless track. In other embodiments, the track may include a base belt formed with the invention systems and methods described herein after which internal and/or external lugs are fastened thereon.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A method of making an open-ended, reinforced, layered belt comprising;
    training a plurality of parallel tensile cords on a portion of a smooth, rotating, cylindrical mandrel, said portion including a first cavity defined between said smooth mandrel and a molding band or a first gap defined between said smooth mandrel and a laminating roller;
    extruding a top layer material onto said cords and metering it into said first cavity or into said first gap; thereby forming a carcass comprising said cords embedded at one surface of a film of said top layer material;
    training said carcass on a portion of a profiled, rotating, cylindrical mandrel having a profile complementary to a desired belt profile, said portion including a second cavity defined between said profiled mandrel and said molding band or a second gap defined between said profiled mandrel and said laminating roller, and said one surface facing said profiled mandrel;
    extruding a profile layer material onto said profiled mandrel between said carcass and said profiled mandrel surface and metering it into said second cavity or into said second gap; thereby forming said belt comprising said cords embedded between said top layer material and said profile layer material.

2. The method of claim 1 wherein said top layer material and said profile layer material both comprise thermoplastic elastomer or thermoplastic polyurethane.

3. The method of claim 2 wherein said belt has no exposed cord portions except cut cord ends.

4. The method of claim 1 wherein said profiled mandrel is a grooved mandrel and said belt has a toothed or ribbed profile formed by the grooves.

5. The method of claim 1 wherein said carcass is relaxed before said training said carcass.

6. The method of claim 5 wherein said cord is slightly protruding from said one surface of said carcass before said training said carcass.

7. The method of claim 5 wherein said cord is mostly embedded at said one surface of said carcass before said training said carcass.

8. The method of claim 1 wherein said method comprises two passes through a single apparatus comprising said molding band or said laminating roller.

9. The method of claim 8 wherein the first of said two passes comprises said steps of training a plurality of parallel tensile cords and extruding a top layer material, and the second of said two passes comprises said steps of training said carcass and extruding a profile layer material.

10. The method of claim 9 wherein said smooth mandrel is used in said single apparatus for one of said two passes and said smooth mandrel is replaced by said profiled mandrel in said single apparatus for the other of said two passes.

11. A method of making an open-ended, reinforced, layered flat belt comprising;
    training a plurality of parallel tensile cords on a first portion of a smooth, rotating, cylindrical mandrel, said first portion including a first cavity defined between said smooth mandrel and a molding band or a first gap defined between said smooth mandrel and a laminating roller;
    extruding a top layer material onto said cords and metering it into said first cavity or into said first gap; thereby forming a carcass comprising said cords embedded at one surface of a film of said top layer material;
    training said carcass on a second portion of said smooth, rotating, cylindrical mandrel, said second portion including a second cavity defined between said smooth mandrel and said molding band or a second gap defined between said smooth mandrel and said laminating roller, and said one surface facing said smooth mandrel;
    extruding a profile layer material onto said smooth mandrel between said carcass and said smooth mandrel surface and metering it into said second cavity or into said second gap; thereby forming said flat belt comprising said cords embedded between said top layer material and said profile layer material.

12. The method of claim 11 wherein said carcass is relaxed before said training said carcass.

13. The method of claim 12 wherein said cord is slightly protruding from said one surface of said carcass before said training said carcass.

14. The method of claim 12 wherein said cord is mostly embedded at said one surface of said carcass before said training said carcass.

15. The method of claim 11 wherein said method comprises two passes through a single apparatus comprising said smooth mandrel and said molding band or said laminating roller.

16. The method of claim 15 wherein the first of said two passes comprises said steps of training a plurality of parallel tensile cords and extruding a top layer material, and the second of said two passes comprises said steps of training said carcass and extruding a profile layer material.

* * * * *